(12) United States Patent
Oh et al.

(10) Patent No.: US 9,275,458 B2
(45) Date of Patent: Mar. 1, 2016

(54) APPARATUS AND METHOD FOR PROVIDING VEHICLE CAMERA CALIBRATION

(71) Applicant: Electronics and Telecommunications Research Institute, Daejeon (KR)

(72) Inventors: Jaehong Oh, Daejeon-si (KR); Kyong Ho Kim, Daejeon-si (KR); Chang Rak Yoon, Daejeon-si (KR); Seong Yun Cho, Daejeon-si (KR); Hye Sun Park, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 330 days.

(21) Appl. No.: 13/914,257

(22) Filed: Jun. 10, 2013

(65) Prior Publication Data

US 2014/0139671 A1   May 22, 2014

(30) Foreign Application Priority Data

Nov. 19, 2012   (KR) .................. 10-2012-0130816

(51) Int. Cl.
*H04N 7/18* (2006.01)
*H04N 7/12* (2006.01)
*G06T 7/00* (2006.01)

(52) U.S. Cl.
CPC ......... *G06T 7/0018* (2013.01); *B60R 2300/402* (2013.01)

(58) Field of Classification Search
None
See application file for complete search history.

(56) References Cited

U.S. PATENT DOCUMENTS

| | | | |
|---|---|---|---|
| 6,542,840 B2 | 4/2003 | Okamoto et al. | |
| 6,593,960 B1* | 7/2003 | Sugimoto et al. | 348/148 |
| 2001/0012985 A1* | 8/2001 | Okamoto et al. | 702/94 |
| 2008/0117287 A1* | 5/2008 | Park et al. | 348/36 |
| 2008/0129756 A1* | 6/2008 | Iwano | 345/632 |
| 2008/0136912 A1* | 6/2008 | Iwano | 348/148 |
| 2008/0181488 A1* | 7/2008 | Ishii et al. | 382/154 |
| 2008/0186384 A1* | 8/2008 | Ishii et al. | 348/187 |
| 2009/0102630 A1* | 4/2009 | Nordlund | 340/436 |
| 2009/0322878 A1* | 12/2009 | Ishii | 348/148 |
| 2010/0194886 A1* | 8/2010 | Asari et al. | 348/148 |
| 2010/0253784 A1* | 10/2010 | Oleg | 348/187 |
| 2011/0098894 A1* | 4/2011 | Zeng et al. | 701/49 |
| 2011/0216194 A1* | 9/2011 | Kosaki | 348/148 |
| 2012/0236287 A1* | 9/2012 | Lee et al. | 356/4.01 |
| 2012/0323474 A1* | 12/2012 | Breed et al. | 701/117 |

(Continued)

FOREIGN PATENT DOCUMENTS

| | | |
|---|---|---|
| KR | 2001-0078102 | 8/2001 |
| KR | 10-2002-0078826 | 10/2002 |
| KR | 10-0948886 | 3/2010 |

*Primary Examiner* — Joseph Ustaris
*Assistant Examiner* — Talha Nawaz
(74) *Attorney, Agent, or Firm* — Kile Park Reed & Houtteman PLLC

(57) ABSTRACT

A method and apparatus for providing a vehicle camera calibration includes choosing overlap images from among the image information captured by a camera mounted on a vehicle, and filtering images having the same vehicle attitude from among the chosen overlap images on a basis of a map coordinate system and status information of the vehicle, picking out objects in the filtered images, separating stationary objects from the picked out objects, and predicting an angular misalignment with respect to the separated stationary objects.

18 Claims, 6 Drawing Sheets

(56) References Cited

U.S. PATENT DOCUMENTS

| | | | |
|---|---|---|---|
| 2013/0002874 A1* | 1/2013 | Negoro et al. | 348/148 |
| 2013/0108155 A1* | 5/2013 | Mizutani et al. | 382/165 |
| 2013/0135474 A1* | 5/2013 | Sakano et al. | 348/148 |
| 2014/0037136 A1* | 2/2014 | Ramalingam et al. | 382/103 |

* cited by examiner

APPARATUS AND METHOD FOR PROVIDING VEHICLE CAMERA CALIBRATION

RELATED APPLICATIONS

This application claims the benefit of Korean Patent Application No. 10-2012-0130816, filed on Nov. 19, 2012, which is hereby incorporated by reference as if fully set forth herein.

FIELD OF THE INVENTION

The present invention relates to a calibration technology, and more particularly, to an apparatus and method for providing a camera calibration, which is adapted to calibrate a vehicle-mounted camera angular misalignment automatically in order to match real-time safety driving information around a vehicle obtained from at least one camera mounted on the vehicle.

BACKGROUND OF THE INVENTION

In recent years, there has been increasing an interest on a technology in which a single or multiple cameras are mounted on a vehicle to obtain information related to a safety driving such as vehicles, pedestrians, and traffic lanes around the vehicle through an image recognition.

The current technology level merely highlights to display the safety driving information extracted from an image onto the image itself used to pull out the information on a basis of augmented reality concept, however, in the future. However, in order to exhibit real-time dynamic information onto a driver's eye location through a HUD (Head-Up-Display) device, space coordinates of the safety driving information, which is obtained by the camera coordinate system, should be precisely converted to a vehicle coordinate system. In other words, it is possible to express information through the matching when the driver's eye position and the information around the vehicle acquired from the camera are accurately referenced through a common coordinate system.

Moreover, if a number of cameras are mounted in a vehicle, the integration of coordinate systems is more important in order to integrate a lot of video information. For example, when real-time space information, which is acquired from a full 360 degree around the vehicle, is converted into a vehicle coordinate system in unity, it is possible to generate a map for safe driving information around the vehicle moving in real time.

When a camera is mounted on a vehicle, correcting coordinate axes is realistically impossible in order to perfectly match a vehicle coordinate system with a camera coordinate system. The distance between the origins, that is, the distance from an origin of the vehicle coordinate system to an origin of a camera can be calculated precisely using a measuring instrument at the mount of the camera on the vehicle, but an angular misalignment is difficult to measure directly. Further, because a mounted angle always varies due to the impact on the vehicle when driving, a twist, etc., the angle needs the calibration cyclically or whenever an event occurs.

Typically, an angular misalignment calibration is also called as an angular boresight calibration, angular misalignment calibration, or the like, which is a technique widely used in a mapping equipments for acquiring images such as an aerial photogrammetry, LiDAR (Light Detection and Ranging), street views. Because these applications require a high accuracy calibration, the calibration destination precisely surveyed/measured in 3-dimensional is prepared in advance and data for the site of the calibration destination is acquired to strictly and accurately obtain a coordinate axis angular misalignment between an inertial navigation system and a camera or an inertial navigation system and LiDAR, before utilization thereof.

The pre-precision calibration process cannot be done in general vehicles every time, and the angular misalignment cannot be kept stable in the long term due to a rolling of the vehicle as described above, so there is a need to perform the calibration automatically at a time interval or when an event such as a shock occurs.

SUMMARY OF THE INVENTION

In view of the above, the present invention provides an automatic calibration technology of an in-situ camera angular misalignment using a number of suspended objects around the road when driving a vehicle.

More specifically, the present invention provides a method for providing an automatic calibration of a vehicle-mounted camera angular misalignment necessary for precisely converting real-time safety driving subsidiary information such as vehicles, pedestrians and traffic lanes obtained around the vehicle through a single camera or a number of cameras mounted on a vehicle into a vehicle coordinate system.

Further, the present invention provides a method for performing an automatic calibration in an in-situ environment as necessary even when driving a vehicle other than a defined environment such as a vehicle assembly line or garage.

In accordance with an aspect of an exemplary embodiment of the present invention, there is provided an apparatus for providing a vehicle camera calibration, which includes: an overlap image selection unit configured to choose overlap images from image information captured by a camera mounted on a vehicle; and a filtering unit configured to filter images having the same vehicle attitude from among the chosen overlap images on a basis of a map coordinate system and status information of the vehicle; an object pick-out unit configured to pick out objects in the images filtered by the filtering unit; an object separation unit configured to separate stationary objects from among the objects picked out by the object pick-out unit; and an angular misalignment prediction unit configured to predict an angular misalignment with respect to the stationary objects separated by the object separation unit.

In the exemplary embodiment, wherein the object pick-out unit is configured to pick out the stationary objects using image information on road facilities.

In the exemplary embodiment, wherein the object pick-out unit is configured to utilize locations of the objects predicted at a tracking time when there exist objects being tracked.

In the exemplary embodiment, wherein the stationary objects separated by the object separation unit are stored or updated in an object list.

In the exemplary embodiment, wherein the angular misalignment prediction unit is configured to eliminate a camera distortion at an arbitrary location of the stationary objects separated by the object separation unit.

In the exemplary embodiment, wherein an angular misalignment prediction unit is configured to predict the angular misalignment with respect to the stationary objects using the Method of Least Square.

In the exemplary embodiment, wherein a reference coordinate of a vehicle coordinate system of the stationary objects is the summation of a relative coordinate of the stationary objects based on a camera coordinate system at an arbitrary time and the distance from an origin of the vehicle coordinate system to an origin of the camera coordinate system.

In the exemplary embodiment, wherein a three-dimensional coordinate of the vehicle from a first time (t) to a second time (t+1) is the summation of the reference coordinate of the vehicle coordinate system of the stationary objects and the distance that the vehicle moves on a basis of the vehicle coordinate system at the first time (t) for the first time (t) to the second time (t+1).

In the exemplary embodiment, wherein the three-dimensional coordinate of the vehicle from a first time (t) to a second time (t+1) is a coordinate when having the same vehicle attitudes on a basis of the map coordinate system.

In the exemplary embodiment, wherein the image information and the status information on the vehicle are temporally stored for a predetermined time period in the apparatus for providing a vehicle camera calibration.

In accordance with another aspect of an exemplary embodiment of the present invention, there is provided a method for providing a vehicle camera calibration in an apparatus for providing a camera calibration, the method comprising: choosing overlap images from among the image information captured by a camera mounted on a vehicle; and filtering images having the same vehicle attitude from among the chosen overlap images on a basis of a map coordinate system and status information of the vehicle; picking out objects in the filtered images; separating stationary objects from the picked out objects; and predicting an angular misalignment with respect to the separated stationary objects.

In the exemplary embodiment, wherein said picking out objects comprises: picking out the stationary objects using image information on road facilities.

In the exemplary embodiment, wherein said picking out objects comprises: utilizing locations of the objects predicted at a tracking time when there exist objects being tracked.

In the exemplary embodiment, further comprising: storing the stationary objects in a list of the objects being tracked; and updating the stationary objects in the list of the objects being tracked.

In the exemplary embodiment, wherein said predicting an angular misalignment comprises: eliminating a camera distortion at an arbitrary location of the separated stationary objects.

In the exemplary embodiment, wherein said predicting an angular misalignment comprises: predicting the angular misalignment with respect to the stationary objects using the Method of Least Square.

In the exemplary embodiment, wherein said predicting an angular misalignment comprises: calculating a reference coordinate of a vehicle coordinate system of the stationary objects by summing a relative coordinate of the stationary objects based on a camera coordinate system at an arbitrary time and the distance from an origin of the vehicle coordinate system to an origin of the camera coordinate system.

In the exemplary embodiment, wherein said predicting an angular misalignment comprises: calculating a three-dimensional coordinate of the vehicle from a first time (t) to a second time (t+1) by summing the reference coordinate of the vehicle coordinate system of the stationary objects and the distance that the vehicle moves on a basis of the vehicle coordinate system at the first time (t) for the first time (t) to the second time (t+1).

In the exemplary embodiment, wherein the three-dimensional coordinate of the vehicle from a first time (t) to a second time (t+1) is a coordinate when having the same vehicle attitudes on a basis of the map coordinate system.

In the exemplary embodiment, wherein the image information and the status information on the vehicle are temporally stored for a predetermined time period in the apparatus for providing a vehicle camera calibration.

In accordance with the present invention, the vehicle-mounted camera angular misalignment calibration can be performed automatically without a user interaction. Further, a driver needs not to perform a separate procedure such as visiting a place for calibration, setting-up/selecting a calibration target, and performing a limited movement of the vehicle, thereby improving a user convenience. In addition, when it is needed to set the angular misalignment again due to an impact on the vehicle while driving, the automatic in-situ calibration is performed systemically and thus the safety driving information can continue to offer seamlessly.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Figure 1:
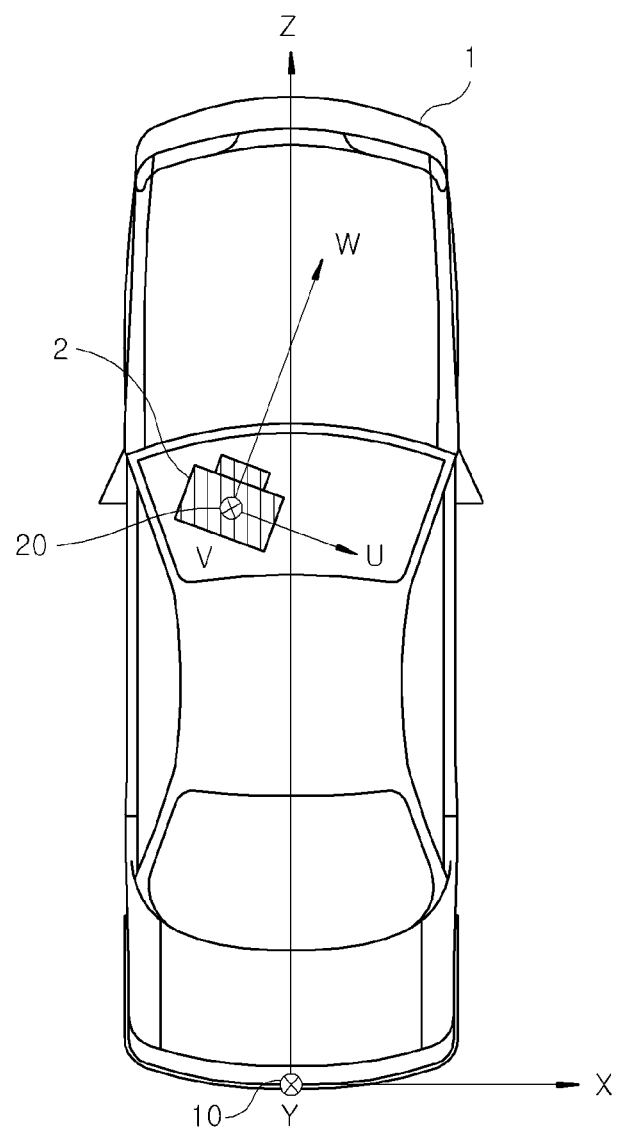
FIG. 1 is an exemplary diagram illustrating a vehicle coordinate system and a camera coordinate system, which is applicable to an embodiment of the present invention.

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

The combinations of the each block of the block diagram and each operation of the flow chart may be performed by computer program instructions. Because the computer program instructions may be loaded on a general purpose computer, a special purpose computer, or a processor of programmable data processing equipment, the instructions performed through the computer or the processor of the programmable data processing equipment may generate the means performing functions described in the each block of the block diagram and each operation of the flow chart. Because the computer program instructions may be stored in a computer usable memory or computer readable memory which is capable of intending to a computer or other programmable data processing equipment in order to embody a function in a specific way, the instructions stored in the computer usable memory or computer readable memory may produce a manufactured item involving the instruction means performing functions described in the each block of the block diagram and each operation of the flow chart. Because the computer program instructions may be loaded on the computer or other programmable data processing equipment, the instructions performed by the computer or programmable data processing equipment may provide the operations for executing the functions described in the each block of the block diagram and each operation of the flow chart by a series of functional operations being performed on the computer or programmable data processing equipment, thereby a process executed by a computer being generated.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

Before describing the present invention, it is noted that the present invention provides an automatic calibration of a vehicle-mounted camera angular misalignment necessary for precisely converting real-time safety driving subsidiary information such as vehicles, pedestrians and traffic lanes obtained around a vehicle through a single camera or a number of cameras mounted on a vehicle into a vehicle coordinate system, and provides an automatic calibration technology of an in-situ camera angular misalignment using a number of suspended objects around the road when driving the vehicle, whereby the subject of the present invention will be achieved easily from the technical idea.

Hereinafter, embodiments of the present invention will be described in detail with reference to the accompanying drawings.

FIG. 1 is an exemplary diagram illustrating a vehicle coordinate system and a camera coordinate system, which is applicable to an embodiment of the present invention.

As illustrated in FIG. 1, a reference numeral 1 represents a vehicle, and a reference numeral 2 represents a camera mounted on the vehicle 1.

A reference numeral 10 denotes an origin of a vehicle coordinate system, and a reference numeral 20 denotes an origin of a camera coordinate system.

There are present an X-coordinate axis and a Z-coordinate axis on a basis of the origin 10 of the vehicle coordinate system and a Y-coordinate axis downward the origin 10 of the vehicle coordinate system. The coordinate axes may be set in line with the right-hand rule.

Further, there are present a U-coordinate axis and a W-coordinate axis on a basis of the origin 20 of the camera coordinate system and a V-coordinate axis downward the original 20 of the camera coordinate system. The coordinate axes may be set in line with the right-hand rule.

The concept of the embodiment of the present invention may be applied commonly to a multiple camera system without limiting to a single camera system as shown in FIG. 1. Further, the vehicle and camera coordinate axes may be set differently as necessary.

Figure 2:
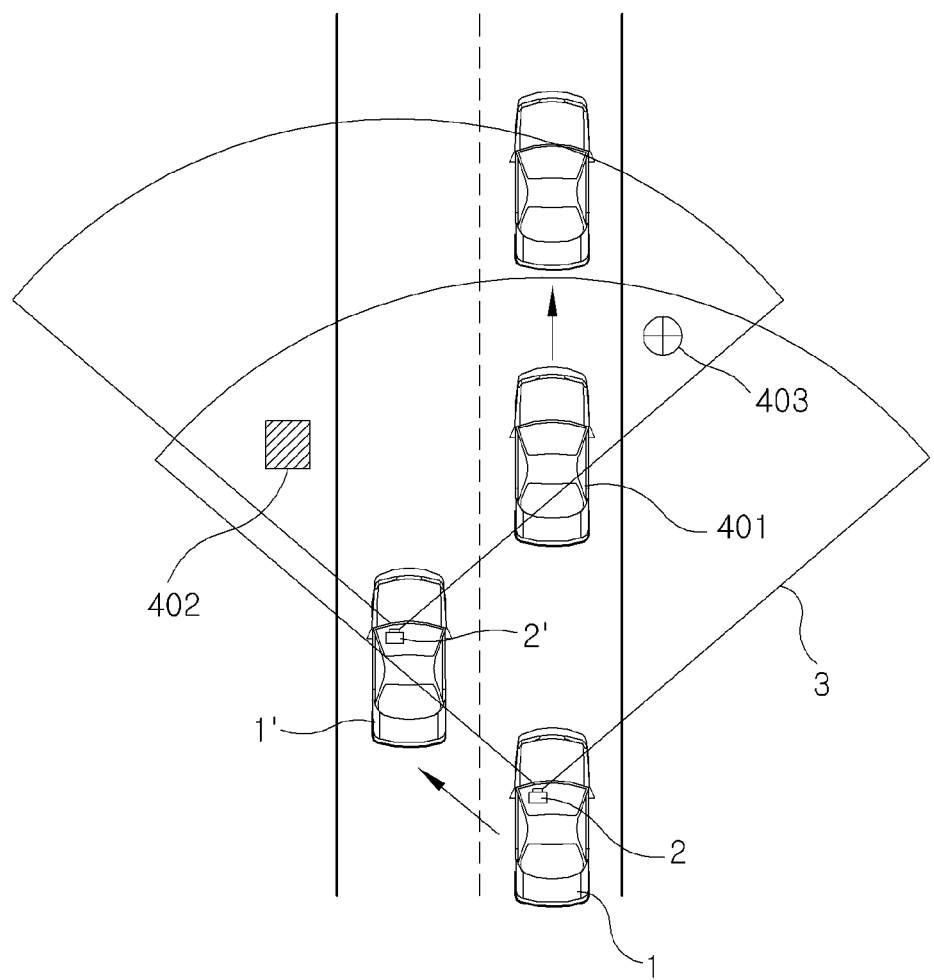
FIG. 2 is an exemplary diagram illustrating an image acquisition using a front-mounted camera on a vehicle while driving the vehicle.

FIG. 2 is an exemplary diagram illustrating an image acquisition using a front-mounted camera 2 on a vehicle 1 while driving the vehicle in accordance with an embodiment of the present invention. The embodiment as illustrated in FIG. 2 does not be limited to the front-mounted camera and may also be applied to a camera mounted in any direction of a full 360 degree around the vehicle.

As illustrated in FIG. 2, the vehicle 1 is at a location at a time (t), and an image of objects 401, 402, and 403 located at the front is captured depending on a view of angle 3. In the drawing, the object 401 may be a moving object, for example, a vehicle at the front, the objects 402 and 403 may be stationary objects, for example, signs and pedestrians.

Since then, as the vehicle 1 moves into a location which is represented as a reference numeral 1', the same objects may be captured at a time (t+a).

Figure 3A:
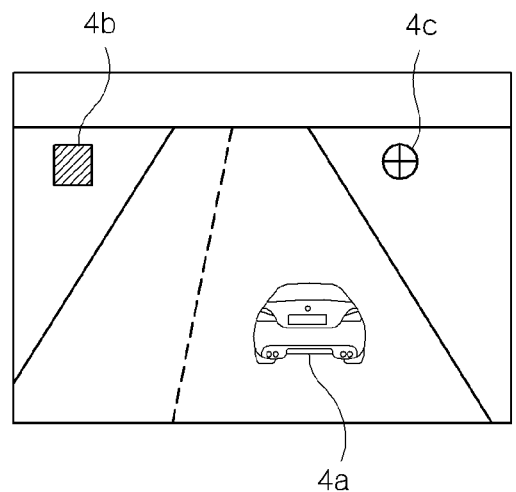
FIGS. 3A and 3B illustrate images wherein an object in front of a vehicle appears commonly in the images as the vehicle moves.
Figure 3B:
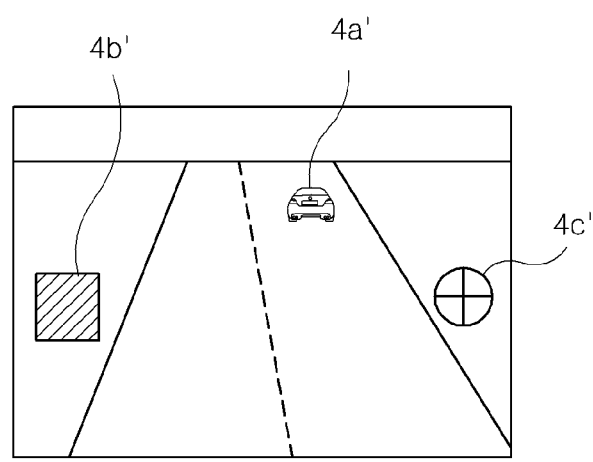

FIGS. 3A and 3B illustrate images wherein an object in front of a vehicle appears commonly in the images as the vehicle moves. For example, in a case where an image of objects 4a, 4b, 4c is captured by the vehicle 1, the image of the same objects 4a', 4b', 4c' is captured with only difference in size as the vehicle 1 moves into a location which is represented as a reference numeral 1' as shown FIG. 2.

Meanwhile, a three-dimensional coordinate based on the vehicle coordinate system of the object observed at the time (t) can be calculated as a following Equation 1.

$$\begin{bmatrix} X_{o_{402}}^{(t)} \\ Y_{o_{402}}^{(t)} \\ Z_{o_{402}}^{(t)} \end{bmatrix} = R_c^V \begin{bmatrix} U_{o_{402}}^{(t)} \\ V_{o_{402}}^{(t)} \\ W_{o_{402}}^{(t)} \end{bmatrix} + \begin{bmatrix} dX_C^V \\ dY_C^V \\ dZ_C^V \end{bmatrix} \qquad \text{Equation 1}$$

where $U_{o_{402}}^{(t)}$, $V_{o_{402}}^{(t)}$ and $W_{o_{402}}^{(t)}$ represent the relative coordinate values of the stationary object 402 shown in FIG. 2 based on the camera coordinate system at the time (t); and $X_{o_{402}}^{(t)}$, $Y_{o_{402}}^{(t)}$ and $Z_{o_{402}}^{(t)}$ represent coordinate values of the stationary object 402 based on the vehicle coordinate system at the time (t).

Further, $dX_C^V$, $dY_C^V$ and $dZ_C^V$ represent distances (offsets) from the origin 10 of the vehicle coordinate system to the origin 20 of the camera coordinate system, which may be calculated precisely by an anti-reflective total station which is a surveying instrument used in a camera installation.

$R_c^V$ denotes a rotation matrix composed of an angular misalignment of a roll $\alpha$, a pitch $\beta$ and yaw $\gamma$. The rotation matrix can be calculated as a following Equation 2.

$$R_c^V = R_{c_\gamma}^V R_{c_\beta}^V R_{c_\alpha}^V \qquad \text{Equation 2}$$

where $$R_{c_\alpha}^V = \begin{bmatrix} 1 & 0 & 0 \\ 0 & \cos\alpha & \sin\alpha \\ 0 & -\sin\alpha & \cos\alpha \end{bmatrix},$$

$$R_{c_\beta}^V = \begin{bmatrix} \cos\beta & 0 & -\sin\beta \\ 0 & 1 & 0 \\ \sin\beta & 0 & \cos\beta \end{bmatrix}$$

-continued
and $$R_{c\gamma}^{V} = \begin{bmatrix} \cos\gamma & \sin\gamma & 0 \\ -\sin\gamma & \cos\gamma & 0 \\ 0 & 0 & 1 \end{bmatrix}$$

A coordinate value of an object based on the vehicle coordinate system at a time (t+1) by a three-dimensional movement of the vehicle, that is, a movement or a rotation, between at the time (t) and the time (t+1), can be expressed as a following Equation 3 in the same way. It is, however, assumed that the angular misalignment will not be changed during the time. Typically, the assumption may be satisfied unless an impact on the vehicle or a physical blow to the camera is not applied because the time has a short time period.

$$\begin{bmatrix} X_{o_{402}}^{(t+1)} \\ Y_{o_{402}}^{(t+1)} \\ Z_{o_{402}}^{(t+1)} \end{bmatrix} = R_{(t)}^{(t+1)} \left( \begin{bmatrix} X_{o_{402}}^{(t)} \\ Y_{o_{402}}^{(t)} \\ Z_{o_{402}}^{(t)} \end{bmatrix} + \begin{bmatrix} dX_{(t)}^{(t+1)} \\ dY_{(t)}^{(t+1)} \\ dZ_{(t)}^{(t+1)} \end{bmatrix} \right)$$

Equation 3 where $R_{(t)}^{(t+1)}$ is a rotation matrix composed of a rotation angle of a vehicle between the time (t) and the time (t+1), $dX_{(t)}^{(t+1)}$, $dY_{(t)}^{(t+1)}$ and $dZ_{(t)}^{(t+1)}$ represent distances that the vehicle moves on a basis of the vehicle coordinate system of the time (t) for a time interval. The distances may be obtained through a sensor such as an accelerometer.

The vehicle may move for a time (t+1), (t+2), ..., (t+n) and the camera mounted on the vehicle may capture a series of images during the time.

In this case, when an attitude of the vehicle (an attitude based on the map coordinate system) at a time (t+a) is same as an attitude of the vehicle at the time (t) and the object 402, which is a stationary object such as a traffic sign, includes information on the object ($O_{402}$), the Equation 3 may be simplified as a following Equation 4. In this case, it does not matter if the vehicle attitudes are same (that is, if $R_{(t)}^{(t+a)}$ is a unit matrix) and the vehicle has been moved in any direction.

$$\begin{bmatrix} X_{o_{402}}^{(t+a)} \\ Y_{o_{402}}^{(t+a)} \\ Z_{o_{402}}^{(t+a)} \end{bmatrix} = \begin{bmatrix} X_{o_{402}}^{(t)} \\ Y_{o_{402}}^{(t)} \\ Z_{o_{402}}^{(t)} \end{bmatrix} + \begin{bmatrix} dX_{(t)}^{(t+a)} \\ dY_{(t)}^{(t+a)} \\ dZ_{(t)}^{(t+a)} \end{bmatrix}$$

Equation 4

By obtaining the difference between object coordinate values at the time (t+a) and the time (t), Equation 5 can be induced. A value of the left side in the Equation 5 may be calculated using measurements of an external sensor such as INS (Inertial Navigation System), and coordinate values except the rotation matrix of the right side can be directly obtained from the image, thereby leaving $R_c^V$ as an unknown quantity.

$$\begin{bmatrix} X_{o_{402}}^{(t+a)} \\ Y_{o_{402}}^{(t+a)} \\ Z_{o_{402}}^{(t+a)} \end{bmatrix} - \begin{bmatrix} X_{o_{402}}^{(t)} \\ Y_{o_{402}}^{(t)} \\ Z_{o_{402}}^{(t)} \end{bmatrix} = R_c^V \left( \begin{bmatrix} U_{o_{402}}^{(t+a)} \\ V_{o_{402}}^{(t+a)} \\ W_{o_{402}}^{(t+a)} \end{bmatrix} - \begin{bmatrix} U_{o_{402}}^{(t)} \\ V_{o_{402}}^{(t)} \\ W_{o_{402}}^{(t)} \end{bmatrix} \right)$$

Equation 5

When tracking a plurality of the stationary objects ($O_{402}$), ($O_{403}$), ..., ($O_m$) inclusive of the objects 402 and 403 which commonly appear in the respective images at the time (t+a) and the time (t), the Equation 5 can be expanded as in Equation 6.

$$\begin{bmatrix} (X_{o_{402}}^{(t+a)} - X_{o_{402}}^{(t)}) & (Y_{o_{402}}^{(t+a)} - Y_{o_{402}}^{(t)}) & (Z_{o_{402}}^{(t+a)} - Z_{o_{402}}^{(t)}) \\ (X_{o_{403}}^{(t+a)} - X_{o_{403}}^{(t)}) & (Y_{o_{403}}^{(t+a)} - Y_{o_{403}}^{(t)}) & (Z_{o_{403}}^{(t+a)} - Z_{o_{403}}^{(t)}) \\ \vdots & \vdots & \vdots \\ (X_{o_m}^{(t+a)} - X_{o_m}^{(t)}) & (Y_{o_m}^{(t+a)} - Y_{o_m}^{(t)}) & (Z_{o_m}^{(t+a)} - Z_{o_m}^{(t)}) \end{bmatrix}^T =$$

$$R_c^V \begin{bmatrix} (U_{o_{402}}^{(t+a)} - U_{o_{402}}^{(t)}) & (V_{o_{402}}^{(t+a)} - V_{o_{402}}^{(t)}) & (W_{o_{402}}^{(t+a)} - W_{o_{402}}^{(t)}) \\ (U_{o_{403}}^{(t+a)} - U_{o_{403}}^{(t)}) & (V_{o_{403}}^{(t+a)} - V_{o_{403}}^{(t)}) & (W_{o_{403}}^{(t+a)} - W_{o_{403}}^{(t)}) \\ \vdots & \vdots & \vdots \\ (U_{o_m}^{(t+a)} - U_{o_m}^{(t)}) & (V_{o_m}^{(t+a)} - V_{o_m}^{(t)}) & (W_{o_m}^{(t+a)} - W_{o_m}^{(t)}) \end{bmatrix}^T$$

Eq. 6

As described above, the left side in the Equation 6 can be obtained by calculating a relative vehicle displacement using an accelerometer and a gyroscope, and an object coordinate on a basis of the camera, which is obtained through a target tracking of the stationary object, is substituted to the right side.

Therefore, the unknown quantity is only the rotation matrix $R_c^V$. Accordingly, the value of the angular misalignment can be estimated by performing a partial differential on the Equation 6 with angular misalignment parameters (such as a roll α, a pitch β and yaw γ) to obtain a linearization and then applying the MLS (Method of Least Square).

If more information acquired at various times is further added, the Equation 6 can be expanded as Equation 7. The example of the Equation 7 was assumed that the stationary objects ($O_p$), ..., ($O_q$) in the images acquired at a time (t+c) and a time (t+b) are tracked.

$$\begin{bmatrix} (X_{o_{402}}^{(t+a)} - X_{o_{402}}^{(t)}) & (Y_{o_{402}}^{(t+a)} - Y_{o_{402}}^{(t)}) & (Z_{o_{402}}^{(t+a)} - Z_{o_{402}}^{(t)}) \\ \vdots & \vdots & \vdots \\ (X_{o_m}^{(t+a)} - X_{o_m}^{(t)}) & (Y_{o_m}^{(t+a)} - Y_{o_m}^{(t)}) & (Z_{o_m}^{(t+a)} - Z_{o_m}^{(t)}) \\ (X_{o_p}^{(t+c)} - X_{o_p}^{(t+b)}) & (Y_{o_p}^{(t+c)} - Y_{o_p}^{(t+b)}) & (Z_{o_p}^{(t+c)} - Z_{o_p}^{(t+b)}) \\ \vdots & \vdots & \vdots \\ (X_{o_q}^{(t+c)} - X_{o_q}^{(t+b)}) & (Y_{o_q}^{(t+c)} - Y_{o_q}^{(t+b)}) & (Z_{o_q}^{(t+c)} - Z_{o_q}^{(t+b)}) \end{bmatrix}^T =$$

$$R_c^V \begin{bmatrix} (U_{o_{402}}^{(t+a)} - U_{o_{402}}^{(t)}) & (V_{o_{402}}^{(t+a)} - V_{o_{402}}^{(t)}) & (W_{o_{402}}^{(t+a)} - W_{o_{402}}^{(t)}) \\ \vdots & \vdots & \vdots \\ (U_{o_m}^{(t+a)} - U_{o_m}^{(t)}) & (V_{o_m}^{(t+a)} - V_{o_m}^{(t)}) & (W_{o_m}^{(t+a)} - W_{o_m}^{(t)}) \\ (U_{o_p}^{(t+c)} - U_{o_p}^{(t+b)}) & (V_{o_p}^{(t+c)} - V_{o_p}^{(t+b)}) & (W_{o_p}^{(t+c)} - W_{o_p}^{(t+b)}) \\ \vdots & \vdots & \vdots \\ (U_{o_q}^{(t+c)} - U_{o_q}^{(t+b)}) & (V_{o_q}^{(t+c)} - V_{o_q}^{(t+b)}) & (W_{o_q}^{(t+c)} - W_{o_q}^{(t+b)}) \end{bmatrix}^T$$

Eq. 7

Figure 4:
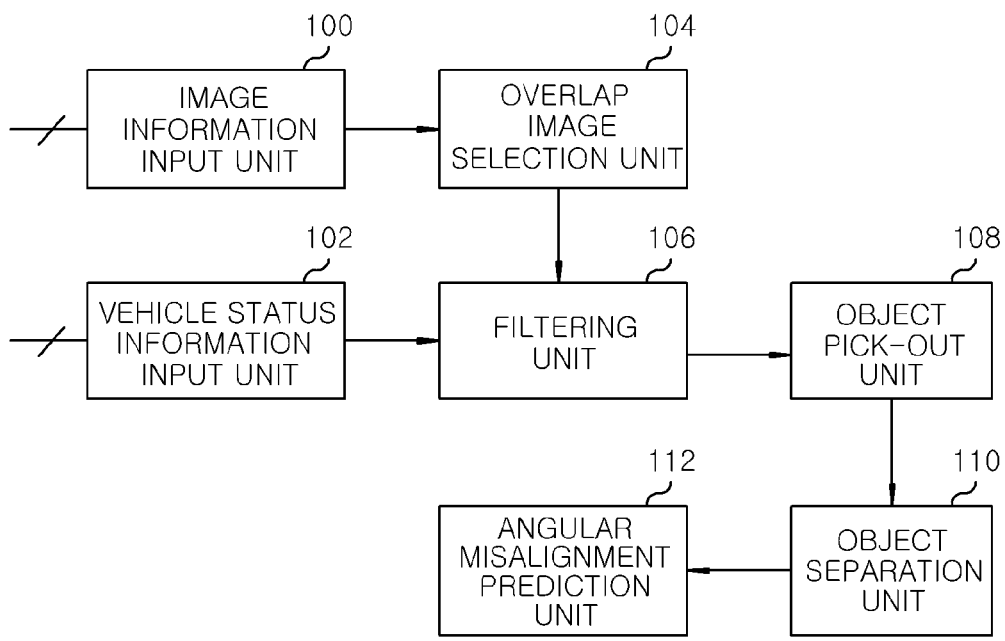
FIG. 4 is a block diagram of an apparatus for providing a vehicle camera calibration in accordance with an embodiment of the present invention.

FIG. 4 is a block diagram of an apparatus for providing a vehicle camera calibration in accordance with an embodiment of the present invention. The apparatus includes an image information input unit 100, a vehicle status information input unit 102, an overlap image selection unit 104, a filtering unit 106, an object pick-out unit 108, an object separation unit 110, and an angular misalignment prediction unit 112.

As illustrated in FIG. 4, the image information input unit 100 receives image information captured by a camera 2 mounted on the vehicle 1 and provides the image information to the overlap image selection unit 104.

The vehicle status information input unit 102 receives information on a vehicle status such as a location and attitude of the vehicle 1 and map coordinate system, etc., which are measured by a navigation system (not shown) in the vehicle 1, and provides the vehicle status information to the filtering unit 106.

The image information and the vehicle status information are temporally stored for a predetermined time period in a separate storage device (not shown) such as a flash memory unit. For example, image information and vehicle status information at times (t+1), (t+2), . . . , (t+n) may be stored.

The overlap image selection unit 104 serves to choose overlap images from the image information provided through the image information input unit 100. For example, the overlap image selection unit 104 may choose the overlap images from the image information captured for a predetermined time period through the camera 2.

The filtering unit 106 filters images having the same vehicle attitude from among the overlap images chosen through the overlap image selection unit 104 on a basis of a map coordinate system of the vehicle status information provided by the vehicle status information input unit 102. For example, when a vehicle attitude at a time (t+a) is equal to a vehicle attitude at a time (t), the filtering unit 106 filters the images having the same vehicle attitude. Further, an image has an object ($O_{402}$) which is a stationary object 402 such as a traffic sign, the filtering unit 106 filters the image.

The object pick-out unit 108 picks out objects suitable as a target image in the images filtered by the filtering unit 106. A way to pick out an object, for example, may apply the way to use image information about road facilities such as a traffic sign, traffic lights and the like to be extracted.

The object separation unit 110 separates a stationary object from among the image having a picked-out object. For example, if it is assumed that an image has picked-out objects 401, 402, and 403 in FIG. 2, only the stationary objects 402 and 403 except the moving object 401 are separated from the image. The stationary objects separated by the object separation unit 110 may be stored or updated.

The angular misalignment estimation unit 112 eliminates a camera distortion of the stationary objects finally extracted through the object separation unit 110 and predicts the angular misalignment. The prediction of the angular misalignment may be implemented by, e.g., the MLS. Accuracy may be enhanced through a repeated calculation when applying the MLS.

Figure 5:
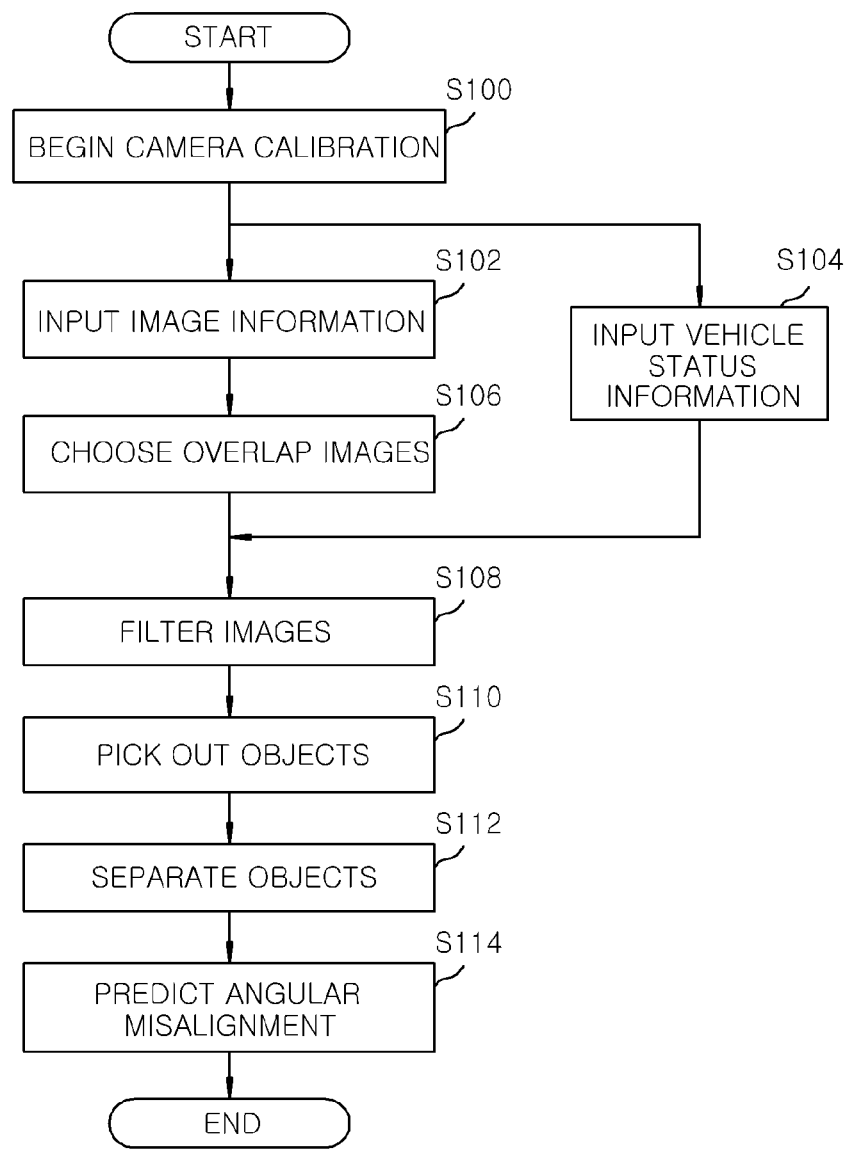
FIG. 5 is a flow chart illustrating a method for providing a vehicle camera calibration in accordance with an embodiment of the present invention.

FIG. 5 is a flow chart illustrating a method for providing a vehicle camera calibration in accordance with an embodiment of the present invention.

Hereinafter, along with the configuration as described above, a method for providing a vehicle camera calibration in accordance with the embodiment will be explained in detail.

As illustrated in FIG. 5, the camera calibration begins with a request from a user or a self-start feature in operation S100, and the image information captured by the camera 2 is input through the image information input unit 100 and temporally stored in a separate memory unit in operation S102.

Simultaneously, the status information on the vehicle 1, for example, the location, attitude, etc. of the vehicle is input through the vehicle status information input unit 102 and is temporally stored in the separate memory unit, in operation S104.

Thereafter, the image information captured by the camera 2 is secured as data for a predetermined time period and the overlap images are chosen from the image information through an overlap image selection operation in operation S106.

Next, in the filtering unit 106, the images having the same vehicle attitude on a map-coordinate basis are filtered from among the chosen overlap images in operation S108.

In the object pick-out unit 108, the objects that are suitable for a target are picked out, in operation S110, by employing a technique to use image information about road facilities such as a traffic sign, traffic lights and the like to be extracted.

In operation S112, the object separation unit 110 separates the stationary objects such as objects of the traffic signs from the moving objects such as the vehicle at the front.

Finally, in operation S114, the angular misalignment prediction unit 112 eliminates a camera distortion in the location of the stationary objects that are finally picked-out and predicts the angular misalignment by using the MLS or the like. In applying the MLS, the accuracy of the prediction of the angular misalignment may be enhanced through a repeated operation of the MLS.

Figure 6:
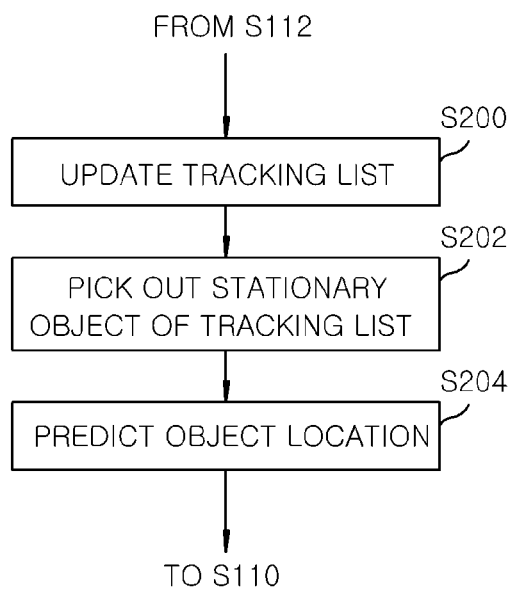
FIG. 6 depicts a flow diagram illustrating a procedure of predicting an object location of an object being tracked in an object separation operation.

FIG. 6 depicts a flow diagram illustrating a procedure of predicting an object location of an object being tracked in an object separation operation.

First, the stationary objects, which is separated in the operation S112, is stored and updated in a tracking list in operation S200, and the stationary objects stored and updated in the tracking list are picked out in operation S202.

In operation S204, when the stationary objects in the tracking list are picked out, the locations of the stationary objects are predicted and the predicted locations of the stationary objects are reflected in the object pick-out operation S110.

Therefore, if there exist objects being tracked, the location of the objects at that time can be predicted for the utilization.

As described above, in accordance with the present invention, it is possible to automatically perform the vehicle-mounted camera angular misalignment calibration without a user interaction, and a driver needs not to perform a separate procedure such as visiting a place for calibration, setting-up/selecting a calibration target, and performing a limited movement of the vehicle, thereby improving a user convenience. In addition, when there is a need to set the angular misalignment again due to an impact on the vehicle while driving, the automatic in-situ calibration is performed systemically and thus the safety driving information can continue to offer seamlessly.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An apparatus for providing calibration of a vehicle camera mounted on a vehicle, the apparatus comprising:
   an overlap image selection unit that determines a predetermined time period and chooses images from images captured by the vehicle camera during the predetermined time period, the chosen images including at least a same object;
   a filtering unit that receives the chosen images from the overlap image selection unit and extracts images captured at a substantially identical vehicle attitude of the vehicle from the chosen images on a basis of a map coordinate system and status information of the vehicle, the status information including at least one of location and attitude of the vehicle;

an object pick-out unit that receives the extracted images from the filtering unit and picks out objects commonly existing in the extracted images;

an object separation unit that receives the picked out objects from the object pick-out unit and separates stationary objects from the picked out objects; and an angular misalignment prediction unit that receives the stationary objects from the object separation unit to predict an angular misalignment of the vehicle camera based on the stationary objects separated by the object separation unit, wherein a three-dimensional coordinate of the vehicle from a first time (t) to a second time (t+1) is a summation of a reference coordinate of a vehicle coordinate system of the stationary objects and a distance that the vehicle moves on a basis of the vehicle coordinate system at the first time (t) for the first time (t) to the second time (t+1).

2. The apparatus of claim 1, wherein the object pick-out unit is configured to pick out the stationary objects using image information on road facilities.

3. The apparatus of claim 1, wherein the object pick-out unit is configured to utilize locations of the objects predicted at a tracking time when there exist objects being tracked.

4. The apparatus of claim 3, wherein the stationary objects separated by the object separation unit are stored or updated in an object list.

5. The apparatus of claim 1, wherein the angular misalignment prediction unit is configured to eliminate a camera distortion at an arbitrary location of the stationary objects separated by the object separation unit.

6. The apparatus of claim 5, wherein the angular misalignment prediction unit is configured to predict the angular misalignment with respect to the stationary objects using the Method of Least Square.

7. The apparatus of claim 1, wherein the reference coordinate of the vehicle coordinate system of the stationary objects is a summation of a relative coordinate of the stationary objects based on a camera coordinate system at an arbitrary time and a distance from an origin of the vehicle coordinate system to an origin of the camera coordinate system.

8. The apparatus of claim 1, wherein the three-dimensional coordinate of the vehicle from the first time (t) to the second time (t+1) is a coordinate when having the same vehicle attitudes on the basis of the map coordinate system.

9. The apparatus of claim 1, wherein the images captured by the vehicle camera and the status information on the vehicle are temporally stored for the predetermined time period in the apparatus for providing a vehicle camera calibration.

10. A method for providing calibration of a vehicle camera mounted on a vehicle in an apparatus for providing calibration of the video camera, the method comprising:

determining a predetermined time period;

choosing images from images captured by the vehicle camera during the predetermined time period, the chosen images including at least a same object;

extracting images captured at a substantially identical vehicle attitude from the chosen images on a basis of a map coordinate system and status information of the vehicle, the status information including at least one of location and attitude of the vehicle;

picking out objects in the extracted images;

separating stationary objects from the picked out objects; and predicting an angular misalignment of the vehicle camera based on the separated stationary objects, wherein said predicting the angular misalignment comprises:

calculating a three-dimensional coordinate of the vehicle from a first time (t) to a second time (t+1) by summing a reference coordinate of a vehicle coordinate system of the stationary objects and a distance that the vehicle moves on a basis of the vehicle coordinate system at the first time (t) for the first time (t) to the second time (t+1).

11. The method of claim 10, wherein said picking out objects comprises:

picking out the stationary objects using image information on road facilities.

12. The method of claim 10, wherein said picking out objects comprises:

utilizing locations of the objects predicted at a tracking time when there exist objects being tracked.

13. The method of claim 12, further comprising:

storing the stationary objects in a list of the objects being tracked; and updating the stationary objects in the list of the objects being tracked.

14. The method of claim 10, wherein said predicting the angular misalignment comprises:

eliminating a camera distortion at an arbitrary location of the separated stationary objects.

15. The method of claim 14, wherein said predicting the angular misalignment comprises:

predicting the angular misalignment with respect to the stationary objects using the Method of Least Square.

16. The method of claim 10, wherein said predicting the angular misalignment comprises:

calculating the reference coordinate of the vehicle coordinate system of the stationary objects by summing a relative coordinate of the stationary objects based on a camera coordinate system at an arbitrary time and a distance from an origin of the vehicle coordinate system to an origin of the camera coordinate system.

17. The method of claim 10, wherein the three-dimensional coordinate of the vehicle from the first time (t) to the second time (t+1) is a coordinate when having the same vehicle attitudes on the basis of the map coordinate system.

18. The method of claim 10, wherein the images captured by the vehicle camera and the status information on the vehicle are temporally stored for the predetermined time period in the apparatus for providing a vehicle camera calibration.

* * * * *